Sept. 4, 1951            D. DALIN ET AL           2,566,318
METHOD OF MAKING AN EXTENDED SURFACE HEAT EXCHANGE
DEVICE OR SIMILAR COMPOSITE ARTICLE
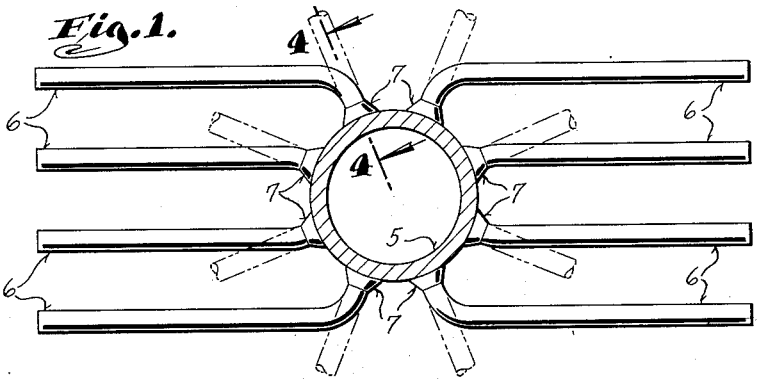
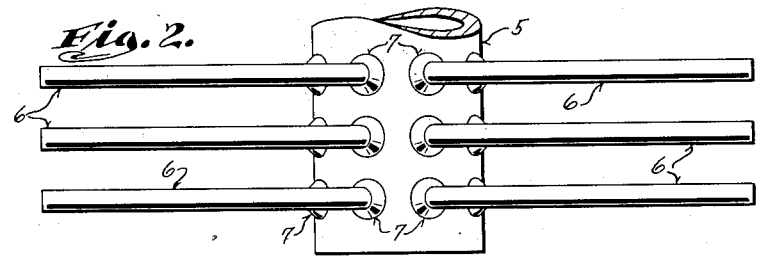
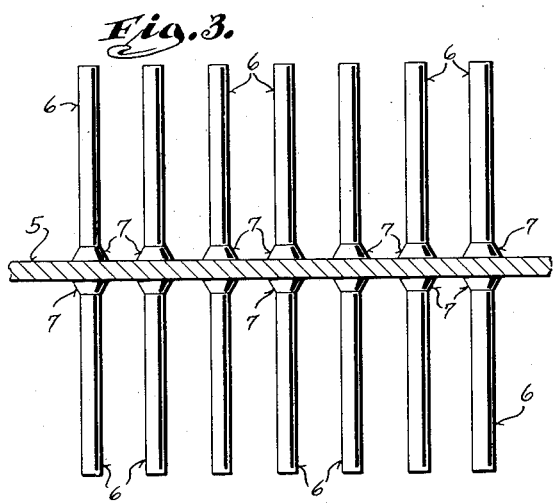
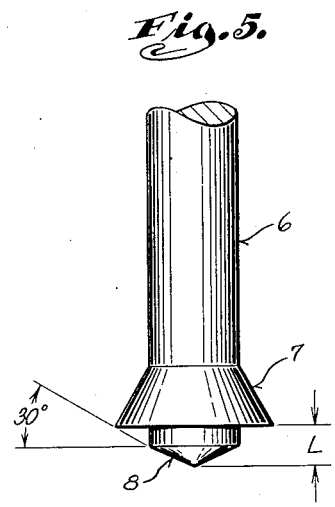
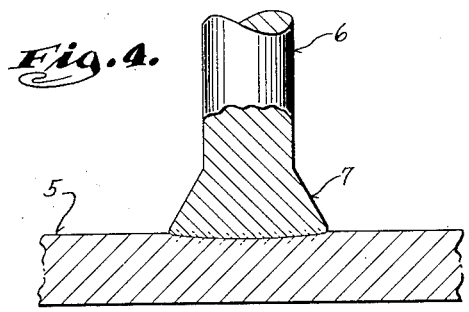
Inventors
David Dalin
Hans J.U. Wangsjo

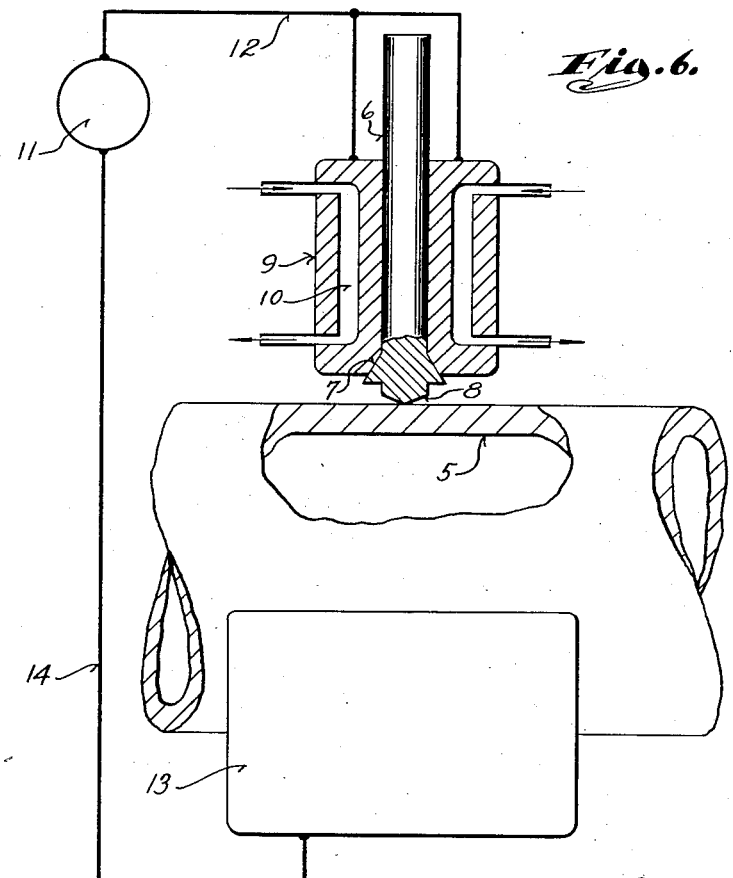
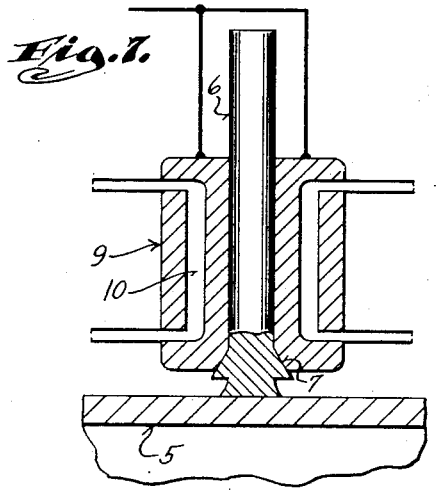
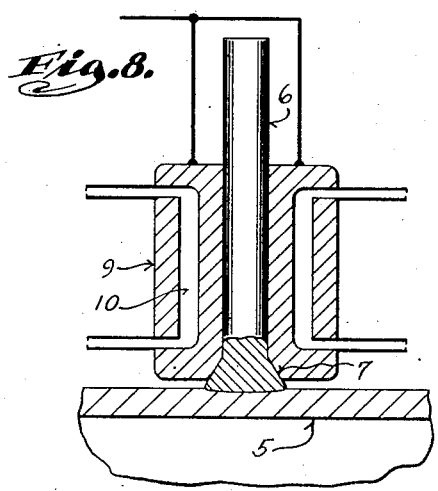

Patented Sept. 4, 1951

2,566,318

UNITED STATES PATENT OFFICE 2,566,318

METHOD OF MAKING AN EXTENDED SURFACE HEAT EXCHANGE DEVICE OR SIMILAR COMPOSITE ARTICLE

David Dalin, Stenkullen, Ronninge, and Hans J. U. Wängsjö, Lidingo, Sweden, assignors to A/B Svenska Maskinverken, Sodertalje, Sweden, a corporation of Sweden Application March 21, 1949, Serial No. 82,574

3 Claims. (Cl. 219—10)

This invention concerns the art of electric welding, and since it refers to a method of making such composite articles as heat exchange devices wherein a large number of closely spaced wire or rod-like elements are directly welded to and project endwise from a base wall (which may be a tube or a flat sheet) it is closely related to the co-pending application of David Dalin, filed March 21, 1949, Serial No. 82,572.

As in said co-pending application the broad purpose of the present invention is to provide a method of making a heat exchanger or other composite article having closely spaced wire or rod-like elements projecting from the surface of a base wall, which enables directly welding the elements to the base wall notwithstanding that the elements are formed of metal having a high coefficient of thermal conductivity and the base wall may be of metal having a substantially lower coefficient of thermal conductivity, and to do this in a manner compatible with production methods of fabrication.

The present invention is particularly applicable to the welding of rod-like elements having high thermal conductivity to a base wall which is also formed of metal having a high coefficient of thermal conductivity, and to such difficult combinations as aluminum and steel.

Another object of this invention is to provide a method of attaching such elements to a base wall which assures the presence of an enlarged foot or base at the attached end of each element to achieve the desired strength in the junction, in the case where the element and base wall are formed of the same metal, and to assure uniform heat distribution throughout the base wall where the base wall is of metal having a much lower coefficient of heat conductivity than the elements.

With the method of the aforesaid co-pending application the desired foot or enlarged base at the attached end of each element is formed automatically during the welding operation. In most instances this is entirely satisfactory, but with certain combinations of metal as, for instance, copper to copper, aluminum to aluminum and aluminum to steel, difficulties were encountered.

It is, therefore, the chief purpose of this invention to improve the method of the co-pending application to the extent that it can be utilized with enirely predictable results with any combination of metals suitable for use in extended surface heat exchangers.

With the above and other objects in view, this invention resides in the novel method and application thereof to the fabrication of heat exchangers and similar composite articles substantially as hereinafter more particularly described and defined by the appended claims, it being understood that such changes in the precise embodiment of the hereindisclosed invention may be made as come within the scope of the claims.

The drawings illustrate at least two heat exchanger structures constructed in accordance with this invention and diagrammatically illustrate how the method of this invention is practiced in the fabrication of such heat exchanger structures.

In these drawings:

Figure 1 is a cross sectional view through an extended surface heat exchanger of the type specifically adapted for use in steam boilers since the base wall is a tube through which water or a steam-water emulsion may flow;

Figure 2 is an elevational view showing a portion of the heat exchanger of Figure 1;

Figure 3 is a sectional view through a heat exchanger structure especially adapted for use in situations where the two flowing media between which heat exchange is to occur have substantially the same alpha value;

Figure 4 is an enlarged detail sectional view taken on the line 4—4 of Figure 1 and illustrating the finished junction between the element and base wall;

Figure 5 is a side elevational view of the lower portion of one of the elements prior to its attachment to the base wall;

Figure 6 is a diagrammatic view illustrating the procedure followed in the welding of the elements to the base wall, said view showing the parts at the start of the welding operation;

Figure 7 is a view similar to Figure 6 but showing the parts at an intermediate stage of the process; and Figure 8 is a view similar to Figure 7 showing the parts at the time the weld is finished.

Referring now particularly to the accompanying drawings, the numeral 5 designates the base wall which may be a tube, as shown in Figures 1, 2 and 6, or a flat plate, as in Figure 3. In each instance rod-like extended surface elements 6 are welded to the surface of the base wall.

Where the base wall is a tube the extended surface elements have their points of attachment equispaced around the circumference of the tube, and are bent near their points of attachment to dispose the elements per se in substantial parallelism.

The same general arrangement would obtain in the case of a flat base wall where the elements are situated on only one side of the wall, except that there would be no need for bending the elements. In the structure shown in Figure 3 the base wall 5 is flat but the elements project from both sides thereof with those on one side coaxial with those on the other side, this arrangement being preferable in this form of heat exchanger.

Since this invention has as one of its chief purposes to provide a method of welding an element of high thermal conductivity to a base wall which also possesses high thermal conductivity special means are provided for insuring the attainment of the welding temperature at the point of the weld, notwithstanding the high electrical conductivity of the base wall. For this purpose each element has one end thereof preformed to shape the same into a flaring skirt 7 and a depending contact portion or tip 8, the latter preferably having substantially the same cross sectional area as the element per se and coming to a point at its outer end. The area of the bottom of the skirt or preformed foot, as it may be termed, should be between two (2) and four (4) times the cross sectional area of the element.

The length L (Figure 5) of the contact portion and consequently its volume is an important factor and has been found to be correct when its bottom edge or lower periphery lies on a line drawn at an angle of thirty degrees (30°) to the horizontal and extending from the periphery of the skirt inwardly toward the axis of the element and the angle of the pointed end is obtuse and preferably no less than one hundred twenty degrees (120°). With these proportions the length L is between approximately 38 percent and 58 percent of the diameter of the element.

The actual welding operation is the same as that described in the co-pending application in that the element is grasped in a chuck 9 having a jacket 10 to permit the same to be cooled by the circulation of a cooling fluid therethrough and then by means of the chuck the contact portion or tip is pressed against the base wall 5.

As the element is thus pressed against the base wall an electric current of low voltage and high amperage is passed across the junction between the contact portion or tip and the base wall. This is done by connecting the two halves of the chuck with one side of a power source 11 by means of a lead 12 and connecting the saddle 13 upon which the base wall (tube) rests with the other side of the power source through a lead 14.

Where the elements project from both sides of the base wall (Figure 3) a second chuck 9' is substituted for the saddle and the lower element is grasped therein. The base wall (sheet) is supported between the two opposed chucks in any desired manner.

With the element shaped as aforesaid, that is, with a skirt formed on the bottom end thereof, the temperature of the contact portion or tip of the element and the directly adjacent portion of the base wall quickly reaches the welding temperature notwithstanding the fact that the base wall as well as the element may be formed of metal having high thermal conductivity.

As the temperature rises the contact portion or tip 8 and the directly adjacent portion of the base wall 5 soften and the contact portion or tip becomes more or less fluid or at least plastic. Pressure and current are maintained until the metal of the tip 8 is spread out over the base wall to substantially the full area of the underside of the skirt or foot 7. At this instant the bottom of the foot or skirt is welded to the base wall by the spread-out metal of the contact portion or tip. Current and pressure are then stopped whereupon the weld is completed, and because of the preformed foot or skirt the area of the junction is sufficient to make the junction fully as strong as the metal of the element per se.

Another advantage of the preformed foot is that during the application of pressure, the wedge action of its flared top which is engaged by the underside of the chuck improves the electrical contact between the chuck and the element. In other words good contact does not depend upon the security of the grip with which the chuck grasps the element.

Moreover, by virtue of the preformed foot and its sound securement to the base wall, maximum heat transfer takes place between the element and the base wall which together with the close spacing of the elements assures substantially uniform heat distribution throughout the entire base wall.

In making the weld all of the various factors must be closely controlled. At the outset it is extremely important to clean the surfaces to be welded. This is especially so in the case of aluminum. Since during the application of pressure the bottom of the chuck bears against the flared top of the skirt the distance which the element projects from the bottom of the chuck is automatically correct providing the proportions of the skirt have been properly established. In addition the following factors must be considered:

1. The welding time
2. The current
3. The force or pressure

The following formulae may be used to determine the correct values for these various factors:

$$t = \frac{k_1}{C_2} + \left(k_2 - \frac{k_3 C_2}{k_4 + C_2}\right) \times A \times 10^{-3}$$

$$I = \frac{1}{\sqrt{t}} \times \left[k_5 + \left(k_6 + k_7 \times \frac{C_1 + C_2}{2}\right) \times A\right]$$

$$F = I \times (k_8 + A) \times \left(k_9 - k_{10} \times \frac{C_1 + C_2}{2}\right) \times k_{11} \times 10^{-4}$$

where
A = cross sectional area of element, mm.$^2$
$t$ = welding time, seconds
$I$ = welding current (the root mean square current), amps.
$C_1$ = electrical conductivity of element, per cent of copper
$C_2$ = electrical conductivity of base wall, per cent of copper
$F$ = welding force, kg.

$k_1 = 0.5$ ⎫
$k_2 = 10$ ⎪ $t$ min.
$k_3 = 12.5$ ⎪
$k_4 = 31$ ⎭

1 ⎫
25 ⎪ $t$ max.
40 ⎪
72 ⎭

$k_5=1000$
$k_6=70\pm50$
$k_7=4.1$
$k_8=100$
$\left.\begin{array}{l}k_9=1.56\\k_{10}=0.0082\end{array}\right\}$Cu $\quad\left.\begin{array}{l}2.4\\0.032\end{array}\right\}$Al
$k_{11}=1\pm40\%$ and where the constants for $C_1$ and $C_2$ are:
Copper=100
Aluminum=65
Aluminum alloys=40
Steel=15
Stainless steel 18/8=2

From the foregoing description taken in connection with the accompanying drawings it will be readily apparent to those skilled in the art that this invention provides a valuable improvement over the method covered in the aforesaid copending application.

What we claim as our invention is:

1. The hereindescribed method of making a composite article having a metal base wall and closely spaced rod-like elements of metal having a high co-efficient of thermal conductivity projecting therefrom, which comprises: shaping one end of each element to provide the same with a flaring skirt and a contact portion projecting from the bottom of the skirt and shaped to have relatively small initial contact with the base wall upon placement of the element perpendicularly thereon; inserting the element in a chuck with the flaring top of the skirt in engagement with the underside of the chuck so that upon the application of downward force on the chuck to press the contact portion of the element against the base wall electrical contact between the chuck and the element is improved by the wedge action of the skirt in the chuck; connecting the base wall and the chuck with opposite sides of a source of low voltage, high amperage electric current so that such current flows across the junction between the contact portion and the base wall, providing said contact portion is in engagement with the base wall; forcing the chuck towards the base wall to press the contact portion endwise against the base wall; and maintaining said force on the chuck and said current flow until the metal of the contact portion spreads out over the base wall to substantially the full area of the skirt bottom and welds the skirt to the base wall.

2. The hereindescribed method of making a composite article having a metal base wall and closely spaced rod-like elements of metal having a high coefficient of thermal conductivity projecting therefrom, which comprises: shaping one end of each element to provide the same with a flaring skirt and a contact portion projecting from the bottom of the skirt and shaped to have relatively small initial contact with the base wall upon placement of the element perpendicularly thereon; inserting the element in a chuck with the flaring top of the skirt in engagement with the underside of the chuck so that upon the application of downward force on the chuck to press the contact portion of the element against the base wall electrical contact between the chuck and the element is improved by the wedge action of the skirt in the chuck; forcing the chuck towards the base wall to press the contact portion endwise against the base wall with a force determined by the formula $$F=I\times(k_8+A)\times\left(k_9-k_{10}\times\frac{C_1+C_2}{2}\right)\times k_{11}\times10^{-4}$$

connecting the base wall and the chuck with opposite sides of a source of low voltage electric current of an amperage determined by the formula $$I=\frac{1}{\sqrt{t}}\times\left[k_5+\left(k_6+k_7\times\frac{C_1+C_2}{2}\right)\times A\right]$$

to thereby cause current to flow across the junction between the contact portion and the base wall; and maintaining said force on the chuck and said current flow for a time interval determined by the formula $$t=\frac{k_1}{C_2}+\left(k_2-\frac{k_3C_2}{k_4+C_2}\right)\times A\times10^{-3}$$

whereupon the metal of the contact portion spreads out over the base wall to substantially the full area of the skirt bottom and welds the skirt to the base wall, wherein said formulae A=cross sectional area of element, mm.²
$t$=welding time, seconds
I=welding current (the root mean square current), amps.
$C_1$=electrical conductivity of element, per cent of copper
$C_2$=electrical conductivity of base wall, per cent of copper
F=welding force, kg.
$\left.\begin{array}{l}k_1=0.5\\k_2=10\\k_3=12.5\\k_4=31\end{array}\right\}t$ min. $\quad\left.\begin{array}{l}1\\25\\40\\72\end{array}\right\}t$ max.
$k_5=1000$
$k_6=70\pm50$
$k_7=4.1$
$k_8=100$
$\left.\begin{array}{l}k_9=1.56\\k_{10}=0.0082\end{array}\right\}$Cu $\quad\left.\begin{array}{l}2.4\\0.032\end{array}\right\}$Al
$k_{11}1\pm40\%$ and where the constants for $C_1$ and $C_2$ are:

Copper=100
Aluminum=65
Aluminum alloys=40
Steel=15
Stainless steel 18/8=2

3. The hereindescribed method of making a heat exchanger unit having a metal base wall and rod-like extended surface elements of metal having an electrical conductivity of between 100 percent and 30 percent that of copper, projecting from the base wall, which method comprises: pressing the rod-like extended surface elements endwise against the surface of the base wall with a force determined by the formula $$F=I\times(k_8+A)\times\left(k_9-k_{10}\times\frac{C_1+C_2}{2}\right)\times k_{11}\times10^{-4}$$

and when said pressure is attained and while it is maintained, passing an electric current of a value determined by the formula $$I=\frac{1}{\sqrt{t}}\times\left[k_5+\left(k_6+k_7\times\frac{C_1+C_2}{2}\right)\times A\right]$$

across the junction between the element and base wall for a period of time determined by the formula $$t=\frac{k_1}{C_2}+\left(k_2-\frac{k_3C_2}{k_4+C_2}\right)\times A\times10^{-3}$$

wherein each of said formulae

A=cross sectional area of element, mm.²
$t$=welding time, seconds $I$ = welding current (the root mean square current), amps.
$C_1$ = electrical conductivity of element, per cent of copper
$C_2$ = electrical conductivity of base wall, per cent of copper
$F$ = welding force, kg.

$$\left.\begin{array}{l}k_1=0.5\\k_2=10\\k_3=12.5\\k_4=31\end{array}\right\}t\text{ min.}\qquad\left.\begin{array}{r}1\\25\\40\\72\end{array}\right\}t\text{ max.}$$

$k_5 = 1000$
$k_6 = 70 \pm 50$
$k_7 = 4.1$
$k_8 = 100$
$\left.\begin{array}{l}k_9=1.56\\k_{10}=0.0082\end{array}\right\}$Cu $\qquad \left.\begin{array}{l}2.4\\0.032\end{array}\right\}$Al
$k_{11} = 1 \pm 40\%$ and where the constants for $C_1$ and $C_2$ are:

Copper = 100
Aluminum = 65
Aluminum alloys = 40
Steel = 15
Stainless steel 18/8 = 2

DAVID DALIN.
HANS J. U. WÄNGSJÖ.

REFERENCES CITED

The following references are of record in the file of this patent:

UNITED STATES PATENTS

| Number | Name | Date |
|---|---|---|
| 1,142,241 | Ellinger | June 8, 1915 |
| 1,982,098 | Hartmann | Nov. 27, 1934 |
| 2,118,446 | Schneider | May 24, 1938 |
| 2,127,685 | Greulich | Aug. 23, 1938 |
| 2,220,579 | Murray | Nov. 5, 1940 |
| 2,231,480 | Pilger | Feb. 11, 1941 |